US012288919B1

(12) United States Patent
Wollack et al.

(10) Patent No.: US 12,288,919 B1
(45) Date of Patent: Apr. 29, 2025

(54) BROADBAND METAMATERIAL TERMINATION FOR PLANAR SUPERCONDUCTING TRANSMISSION LINE CIRCUITS

(71) Applicant: United States of America as represented by the Administrator of NASA, Washington, DC (US)

(72) Inventors: Edward J. Wollack, Clarksville, MD (US); Rahul Datta, Baltimore, MD (US); Karwan Rostem, Greenbelt, MD (US); Kevin L. Denis, Crofton, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 108 days.

(21) Appl. No.: 18/244,720

(22) Filed: Sep. 11, 2023

(51) Int. Cl.
*H01P 1/24* (2006.01)
*H01P 3/00* (2006.01)

(52) U.S. Cl.
CPC . *H01P 1/24* (2013.01); *H01P 3/00* (2013.01)

(58) Field of Classification Search
CPC .................................... H01P 1/24; H01P 3/00
USPC ............................................................ 333/34
See application file for complete search history.

(56) References Cited

U.S. PATENT DOCUMENTS

2020/0052359 A1 * 2/2020 Painter .................. H01P 1/2005

* cited by examiner

*Primary Examiner* — Andrea Lindgren Baltzell
*Assistant Examiner* — Abigail Amir Yaldo
(74) *Attorney, Agent, or Firm* — Heather Goo; Matthew F. Johnston; Trenton J. Roche

(57) ABSTRACT

The present invention minimizes issues with transmission lines through the use of a normal-metal/superconducting meta-material structure realized with controlled impedance sub-wavelength line sections, which effectively concentrate the uncertainty in the section lengths in a portion of the termination geometry which has minimal impact on the non-resonant absorption in the structure. The present invention is used to achieve broadband absorption response and signal termination in planar transmission line devices. The longest wavelength sets the required length of the meta-material line, and its footprint is set by properties of the guiding structure (i.e., the resultant line can be folded, meandered, or spiraled with a spacing set is set by the field confinement of the transmission line topology in use).

11 Claims, 4 Drawing Sheets

BROADBAND METAMATERIAL TERMINATION FOR PLANAR SUPERCONDUCTING TRANSMISSION LINE CIRCUITS

ORIGIN OF THE INVENTION

The invention described herein was at least in-part made by an employee of the United States Government and may be manufactured or used by or for the Government of the United States of America for governmental purposes without the payment of any royalties thereon or therefor.

BACKGROUND OF THE INVENTION

1. Field of the Invention

The present invention relates to a broadband matched termination for use in planar superconducting transmission line circuit structures. The metamaterial implementation is compatible with microfabrication techniques used for microwave through sub-millimeter wave circuitry and the response is insensitive to geometric tolerances, material properties, and interface details of conductive elements used in device fabrication. The present invention leads to terminations with higher performance, device yield, and overall circuit density in far-infrared imaging, polarimetric, and superconducting integral field unit (IFU) spectrometer arrays for instrumentation applications, which include astrophysics.

More broadly, the design has utility in realizing high coupling efficiency absorbers, low reflectance power-combiners/splitters port terminations, and calibration structures for superconducting device applications. The underlying meta-material concept and its desirable attributes can also be implemented at room temperature through the substitution of a high conductivity metal for the superconducting media.

2. Description of the Related Art

Transmission line terminations or "loads" used in planar microwave circuitry range from discrete or "lumped" structures to distributed device implementation. Examples include, simple thin film resistors compensated by resonantly tuned matching circuits as well as lossy adiabatic tapers, which have varying advantages and disadvantages dependent upon the transmission line topology, the design wavelength, spectral range, available and/or viable materials, and thermal environment envisioned for the end application.

Many of the widely employed single-mode design strategies for transmission line circuits rely upon resonant tuning (e.g., impedance matching with a fixed transmission line delay) and have a relatively narrowband response with respect to the needs arising, such as in the context of astrophysical sensors. From a tolerance perspective, these existing single-mode designs can place a significant demand upon achieving the targeted surface resistance set by the transmission line impedance scale and material properties at the operational temperature range of interest. While useful over a narrow waveband and for small variations around room temperature, for operation over an extended temperature range and/or cryogenic applications, these single-mode design strategies can ultimately lead to poor performance and device yield due to the changes in material properties with temperature. For these reasons, resonantly tuned single-mode design strategies are rarely used in high performance or precision microwave circuits where graceful degradation over an extreme temperature range is required.

Although broadband dissipatedly-loaded adiabatic impedance tapers (see FIG. 4), and lossy quarterwave guiding structures avoid these issues, these improvements for planar transmission line (discussed further below and shown in FIG. 3) circuit implementations come at the expense of increased device size/footprint.

Further, the current designs are based upon normal-metals (i.e., non-superconducting materials and alloys) and resistive materials interfaces (e.g., evaporated thin film metals, thick film conductive pastes, conductive and magnetically loaded dielectric materials, etc.) which can lead to limited thermal life cycles and/or applicability for direct use in proximity with superconducting circuit elements.

Intentional discrete or adiabatic dissipative coupling to the transmission line structure can also be used as a termination; however, this strategy leads to higher circuit complexity, footprint, and radiation losses.

Adiabatic electromagnetic structures have generally found utility for use in cryogenic environments because, by design, they are broadband and their performance can be specified in a manner that is relatively insensitive to the implementation detail, material properties, and display graceful degradation from their nominal performance.

The Riccati equation provides a convenient framework to evaluate the propagation properties and response of an adiabatic impedance taper. In its linearized form the solution links the complex reflection amplitude, Γ, and the logarithmic derivative of the relative impedance, $Z_r$, along the guiding media through a Fourier transform relationship where the phase constant is a function of position. To the extent the fractional change in the taper's parameters is small and the conversion to other accessible modes is reversible along the structure—the response is adiabatic. The implicit linkage between the guiding structures impedance profile (or taper) and the response leads to a constraint on required length to achieve a specified reflectance. The incorporation of dissipative materials in the adiabatic taper enables this design strategy to specify a low reflectance circuit termination or calibration load. Depending upon the wavelength relative to the scale of the sub-structure within the device, these implementations can be realized as graded index, photonic, and meta-material structures on the surface of a planar or flexible substrate.

For an example of an adiabatic impedance taper, FIG. 4 shows a plan view of a prior art representative broadband low-reflectance non-resonant microstrip termination 400, with the superconducting metallization layer for the termination input (or reference plane) 401 at the top of the Figure. The normal metal layer 402, which provides dissipation leading to absorption, overlaps the superconducting transmission line 403. The details of this interface are determined by the fabrication alignment and indirectly set the possible range of impedance taper profiles 404, 405 (note: FIG. 4 is not to scale, and the width is greatly expanded to show a representative taper 404, 405 geometry). Due to proximitization of the normal metal 402 by the superconductor 403 and alignment precision, the details of this interface can lead to variations in yield during fabrication. Although the taper shape could be contoured to improve the taper response, for superconducting thin film circuitry this condition is typically unrealized.

With respect to FIG. 4, the reduction in tolerance sensitivity arises because in the prior art, the superconducting London penetration scale proximitizes the taper shape and changes the effective width (i.e., orientated transverse to the line), which leads to an unknown error in the prescribed taper profile. For the metamaterial, the proximitization length scale is the same; however, it is oriented along the section lengths and thus, largely has an impact on the tuning of the device. Given the extremely broadband spectral response (e.g., in the example presented in FIG. 3 the absorption fractional bandwidth is, Δv/v=~1.1), changes in the band of order of the penetration scale relative to the section length are not a driving consideration. However, this is not the case for the adiabatic design where the detailed shape of the taper tip controls the residual reflectance and is blurred or compromised by proximitization of the normal metal by the superconducting film.

Further, existing design examples employ disordered alloys in their normal-metal conductive branch and/or dielectric lossy media in their implementations. These strategies can be used to reduce the temperature dependance of the device (e.g., through the residual resistance ratio (RRR) of thin film resistive film and the transmission line geometry) to a level where room temperature and cryogenic response are nearly identical. This behavior can be used to greatly reduce the fabrication complexity and test and validation cost for cryogenic device implementations.

Elemental metals with high RRR is problematic since the conductivity of the metals changes dramatically on cooling, therefore, changing the electromagnetic properties of the planar circuit. In particular, for the absorptive media, this presents a problem (i.e., one would need to make the metamaterial structure larger). Accordingly, the addition of superconducting materials into the device structure requires careful overview of the design process, device realization, and fabrication risks in the context of reliability, yield, and device stability over its life cycle.

For millimeter-wave planar superconducting transmission line circuit applications, many adjacent microwave room temperature technologies and design strategies are no longer directly applicable. For example, transmission line substrates with normal-metals commonly have thick film polymer substrates greater than 100 microns thick to realize acceptable ohmic losses at room temperature. For superconducting transmission lines, micron and sub-micron scale substrate, metallization, and device features are viable. The performance of these implementations are limited by dielectric losses at frequencies below the superconducting gap energy scale. For this reason, a premium is placed upon the identification and use of the highest quality dielectric media for guiding structures. These reductions in guide size directly enable to lower parasitic junction reactance, lower radiation losses, and higher circuit areal density in superconducting circuit implementations.

Other physical and practical considerations that arise include: 1) normal-metals are desired as the dissipative element of the transmission line structures, as magnetic materials can negatively influence the performance of superconductor transmission lines and can risk contamination of film deposition systems; 2) superconductor kinetic inductance has an influence on the transmission line propagation properties; 3) superconductor-normal-metal proximitization can directly influence the transmission line circuit response through changes in the geometry and kinetic inductance at relevant length scales, which influence the line impedance, propagation parameters, and scattering parameters; 4) superconducting film transition temperature and propagation properties have a dependance on its physical setting (e.g., film stress, magnetic field strength, electrical bias, etc.); and 5) the need for device structures to survive temperature cycling which are extreme relative to traditional microwave circuit implementations leads to a need for significantly more robust mechanical designs and packaging strategies; 6) and more.

The amplitude of the electromagnetic waves, decays exponentially within a conductor with a length scale set by the penetration depth. For a normal metal this is the classical skin depth—for a superconductor the London penetration depth plays this role. Theoretical and simulation strategies for modeling kinetic inductance effects in "homogenous" superconducting elements in transmission lines are relatively well developed and understood. In principle, the surface impedance of a single film is calculated with the extended Bardeen-Cooper-Schrieffer (BCS) Zimmermann formula by considering its imaginary part of the gap energy and the material electron mean free path. However, in practice empirical observational data is required to fully inform these calculations.

In practice, the intrinsic superconducting critical temperature $T_c$ of proximitized bi-layers (as well as longitudinal proximitization at adjacent interfaces) is dependent upon the thickness of each layer and is also sensitive to the interface transmissivity. It is not uncommon for bi-layers fabricated following identical fabrication procedures to observe different outcomes presumably due to weak-link and nonequilibrium superconductivity effects.

Given that the length scale of the proximitized region relative to the transmission total line width is finite and non-negligible for thin film dielectrics—there can be an influence on the effective phase velocity and impedance of the line. If the normal and superconducting lines run the length of the absorptive taper, the response of the line is no longer defined by the geometric discontinuities and variations in features defined by the microfabrication process tolerance but the detailed proximitization of the metallization geometry and its influence on the transmission line impedance and phase velocity. While the influence of this concern can be bounded in electromagnetic simulation, a self-consistent physical treatment of the full problem is presently lacking. These effects can degrade the reflectance of the termination or increase the required footprint to mitigate the resulting design uncertainties.

Thus, a new design strategy which can correct for the above disadvantages, is needed.

SUMMARY OF THE INVENTION

The present invention relates to a broadband matched termination for use in planar superconducting transmission line circuit structures. The metamaterial implementation is compatible with microfabrication techniques used for microwave circuitry and the response is insensitive to geometric tolerances, material properties, and interface details of conductive elements used in device fabrication. The present invention leads to terminations with higher performance, device yield, and overall circuit density in far-infrared imaging, polarimetric, and superconducting integral field unit (IFU) spectrometer arrays for instrumentation applications, which include astrophysics.

More broadly, the design has utility in realizing high coupling efficiency absorbers, low reflectance power-combiners/splitters port terminations, and calibration structures for planar superconducting device applications. The underlying meta-material concept and its desirable attributes can also be implemented at room temperature through the substitution of a high conductivity metal for the superconducting media.

The present invention minimizes issues with reflections through the use of a normal-metal/superconducting meta-material structure realized with controlled impedance sub-wavelength transmission line sections. This effectively concentrates the uncertainty in the section lengths in a portion of the termination geometry that has minimal impact on the non-resonant absorption in the structure. This strategy can be used to achieve broadband absorption response and signal termination in planar transmission line devices. The longest wavelength sets the required length of the meta-material line, and its footprint is set by properties of the guiding structure (i.e., the resultant line can be folded, meandered, or spiraled with a spacing set by the field confinement of the transmission line topology in use).

In one embodiment, the broadband matched termination for use in planar superconducting transmission line circuit structures, includes: a plurality of sub-wavelength alternating sections of normal-metal and superconducting transmission lines connected in series to form a meta-material absorber structure along a direction of propagation along a superconducting guiding structure; wherein a width of each of said plurality of sub-wavelength alternating sections of normal-metal and superconducting transmission lines are varied to effectuate an impedance taper.

In one embodiment, a configuration of the meta-material absorber structure includes propagation properties that are a function of a line geometry and a plurality of electromagnetic material properties.

In one embodiment, the impedance taper is adjusted to define an absorption bandpass shape.

In one embodiment, a length of the impedance taper is set by a residual reflectance, Γ, from a transition between the meta-material absorber structure and the superconducting guiding structure and an absorption of the meta-material absorber structure; and the length attenuates incident radiation within a predetermined footprint.

In one embodiment, the meta-material absorber structure is insensitive to geometric tolerances, material properties, and type of conductive element interface.

In one embodiment, the meta-material absorber structure is implemented at room temperature through a substitution of a high conductivity metal for superconducting media.

In one embodiment, the planar superconducting transmission line circuit structures support transverse electro-magnetic (TEM), quasi-TEM and non-TEM configurations through patterning and layering of conductive layers and dielectric layers.

In one embodiment, the TEM configuration includes at least one of a stripline or a parallel plate, the quasi-TEM configuration includes at least one of: a microstrip, a microstrip with ground plate slot, a finite width coplanar waveguide, or a microstrip with grounded coplanar waveguide; and the non-TEM configuration includes at least one of a slotline or a finite width slotline.

In one embodiment, the TEM, quasi-TEM, and non-TEM configurations include circuit structures each comprising a dielectric layer and a metal layer disposed on said dielectric layer; wherein the dielectric layer includes a homogenous composition and thickness; and wherein said metal layer is patterned to provide a predetermined functionality.

In one embodiment, the plurality of sub-wavelength alternating sections are of constant physical width and uncorrected by compensation or tuning structures.

In one embodiment, the interfaces between the plurality of sub-wavelength alternating sections of normal-metal and superconducting transmission lines serve as step-impedance junctions.

Thus, some features consistent with the present invention have been outlined in order that the detailed description thereof that follows may be better understood, and in order that the present contribution to the art may be better appreciated. There are, of course, additional features consistent with the present invention that will be described below, and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

The description of the drawings includes exemplary embodiments of the disclosure and are not to be considered as limiting in scope.

DESCRIPTION OF THE INVENTION

The present invention relates to a broadband matched termination for use in planar superconducting transmission line circuit structures. The metamaterial implementation is compatible with microfabrication techniques used for microwave circuitry and the response is insensitive to geometric tolerances, material properties, and interface details of conductive elements used in device fabrication. The present invention leads to terminations with higher performance, device yield, and overall circuit density in far-infrared imaging, polarimetric, and superconducting integral field unit (IFU) spectrometer arrays for instrumentation applications, which include astrophysics.

The present invention minimizes issues with transmission lines through the use of a normal-metal/superconducting meta-material structure realized with controlled impedance sub-wavelength line sections, which effectively concentrate the uncertainty in the section lengths in a portion of the termination geometry which has minimal impact on the non-resonant absorption in the structure. The present invention is used to achieve broadband absorption response and signal termination in planar transmission line devices. The longest wavelength sets the required length of the meta-material line, and its footprint is set by properties of the guiding structure (i.e., the resultant line can be folded, meandered, or spiraled with a spacing set is set by the field confinement of the transmission line topology in use).

The present invention has utility in realizing high coupling efficiency absorbers, low reflectance power-combiners/splitters port terminations, and calibration structures for planar superconducting device applications. The underlying meta-material concept and its desirable attributes can also be implemented at room temperature through the substitution of a high conductivity metal for the superconducting media.

Figure 3:
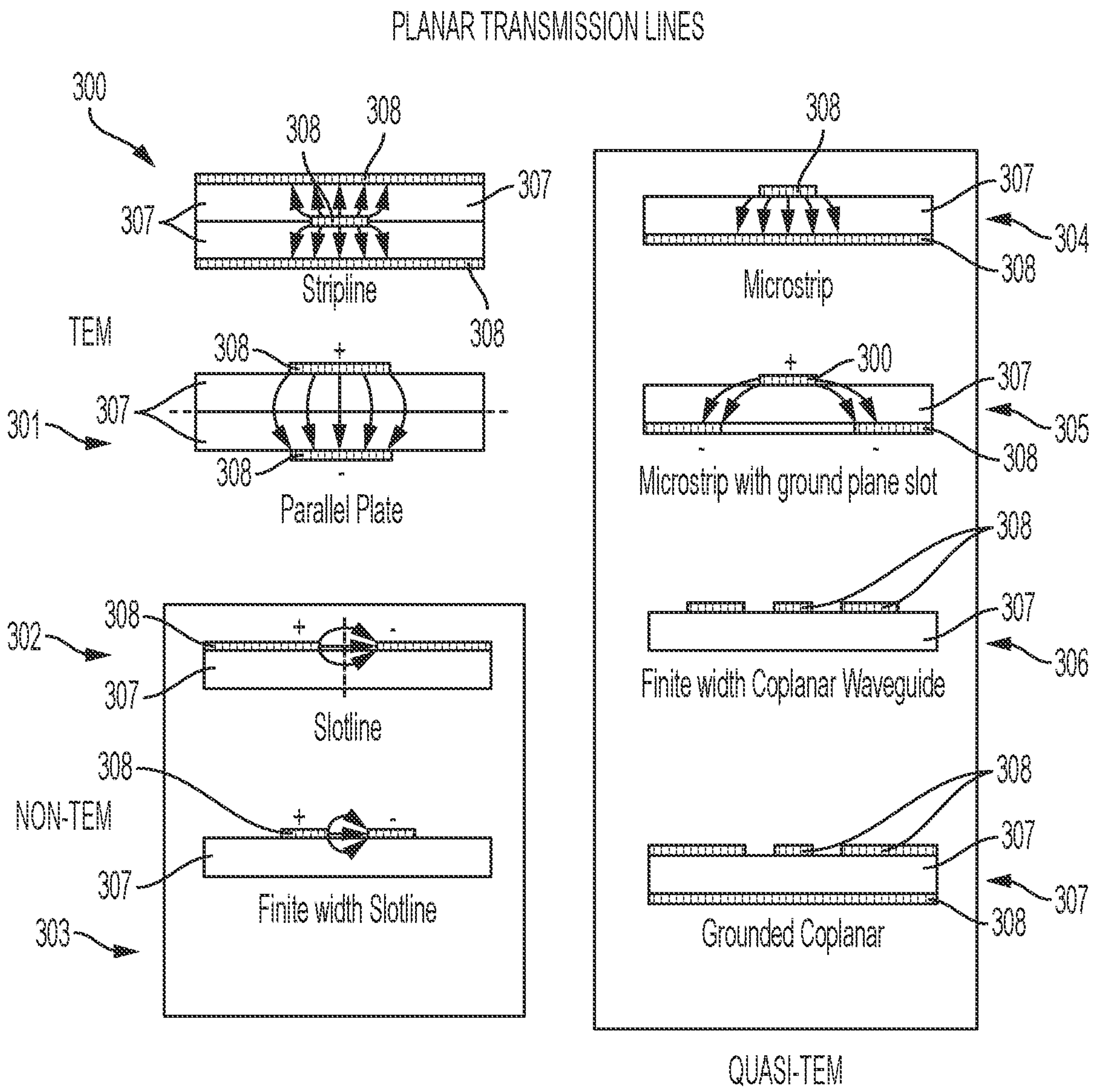
FIG. 3 shows planar transmission lines that accommodate the present termination design, according to one embodiment consistent with the present invention.
Figure 4:
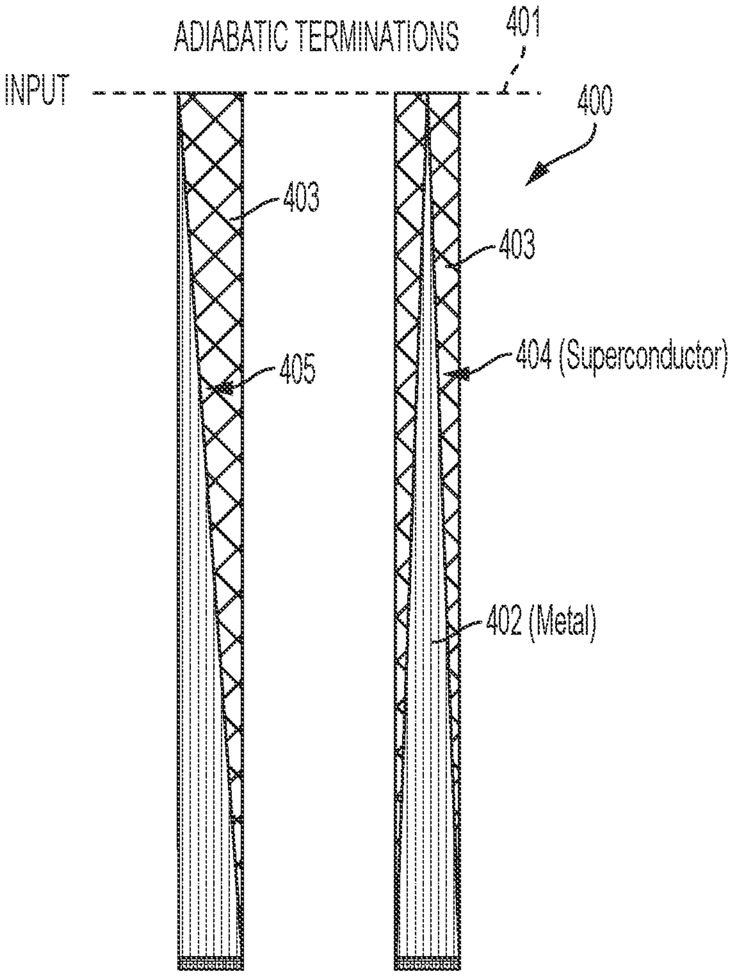
FIG. 4 PRIOR ART
FIG. 4 shows a plan view of prior art adiabatic terminations, according to one embodiment consistent with the present invention.

The present invention can be implemented in planar transmission line structures. FIG. 3 shows schematics of representative planar transmission line guides topology in cross-section. Planar transmission line structures 301-306 include those where the dielectric layers have a homogenous composition and thickness; however, the metal layers can be patterned to provide the desired functionality. Planar transmission lines topologies (see FIG. 3) can be fabricated to support TEM (transverse electro-magnetic) 300-301 or quasi-TEM field 304-307 configurations through patterning and layering of conductive layers 308 (metallic, thin films) and dielectric layers 307 (shown as homogenous with uniform thickness).

Representative examples of TEM (quasi-TEM), and non-TEM, include the following guide structures:

1. Stripline 300;
2. Parallel-plate 301;
3. Microstrip 304;
4. Microstrip with ground plane slot 305;
5. Finite width coplanar waveguide 306;
6. Microstrip with grounded coplanar waveguide 307;
7. Slotline 302;
8. Finite width slotline 303.

In the present invention, each configuration has a unique field configuration or modal shape, range of achievable characteristic impedance scales, and propagation properties that are a function of the line geometry and material properties (e.g., dielectric permittivity, magnetic permeability, electrical conductivity, etc.).

Transmission through and reflection from these elements are controlled by the contrast in impedance and propagation parameters between line sections as well as excitation/conversion to higher order modes storing reactive energy. Absorption (energy losses) in transmission line circuits can occur via finite ohmic losses in conductive elements, displacement currents in dielectrics, radiative losses from discontinuities, and (if present) magnetic dissipation processes. The geometry of the lines and interfaces are used to define and control the flow of light within the transmission line structures. By design, a planar transmission line termination intentionally absorbs radiation presented to it with minimal reflection. The present innovation intentionally introduces controlled impedance normal-metal sub-wavelength features into the transmission line structure. The fabrication process tends to define the preferred implementation, however, from an electromagnetic perspective these features can be incorporated in the single line or the ground plane and thus directly incorporated into a variety of transmission line topologies. In practice, pattering the signal line (or lines) is typically preferable and leads to lower implementation complexity.

Generally speaking, microstrip 304 (slotline) is well suited for coupling to high (low) impedance structures with low (high) radiation losses. In the present invention, the microstrip is used as an exemplary embodiment (see FIGS. 1A-1C), but one of ordinary skill in the art would recognize that the present invention could be embodied in any of the above planar transmission line configurations in FIG. 3.

Figure 1A:
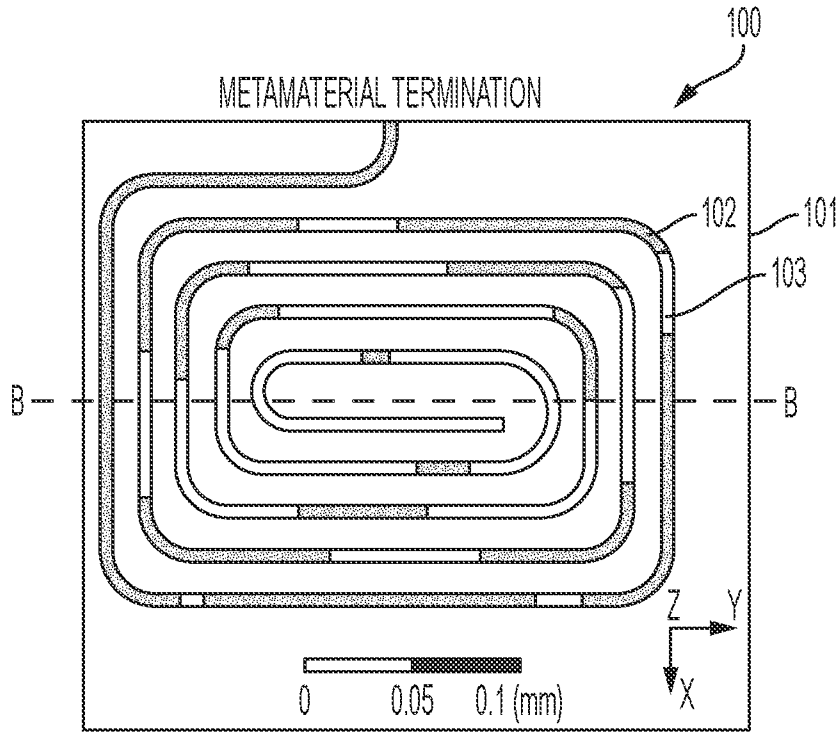
FIG. 1A shows a plan view of a plan view of a metamaterial microstrip termination design for use in a planar transmission line, according to one embodiment consistent with the present invention.
Figure 1C:
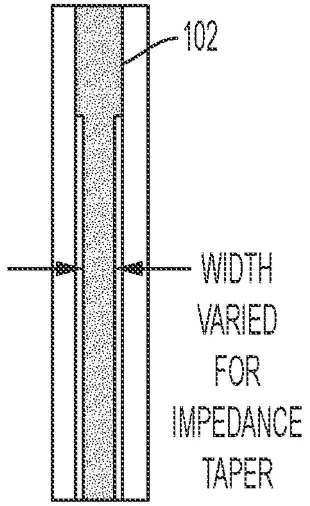
FIG. 1C shows a plan view with detail of a planar transmission section line width of the termination design of FIG. 1A, according to one embodiment consistent with the present invention.
Figure 1B:
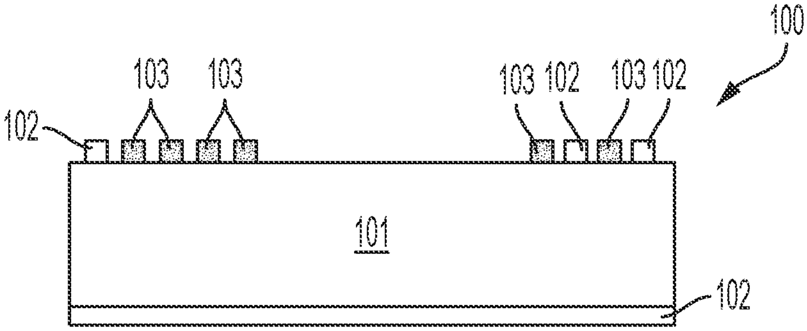
FIG. 1B shows a cross-sectional view along line B-B in FIG. 1A, of a folded planar transmission line, according to one embodiment consistent with the present invention.

In one exemplary embodiment, the present invention includes a metamaterial topology which employs a microstrip configuration transmission line for a high efficiency bolometer absorber, used to convey microwave-frequency signals. FIG. 1A is a plan view of an exemplary metamaterial microstrip 100 termination, with FIG. 1B showing a cross-sectional view of the folded planar transmission line termination along line B-B of FIG. 1A. FIG. 1C is a plan view with detail of the planar transmission section line width.

In one embodiment, FIGS. 1A-1B show a silicon dielectric layer 101 disposed on a ground plane 102 (see FIG. 1B). In one embodiment, niobium (Nb) 102 and a palladium-gold (PdAu) alloy 103 conductor (see FIG. 1A), are disposed on the silicon layer 102.

This novel single-mode approach in the exemplary embodiment of the microstrip 100 distinguishes from existing multi-mode metamaterial absorber structures that provide low reflectance over a range of angles in a two-dimensional (2D) superconducting power combiner.

In one embodiment, sub-wavelength alternating sections of normal-metal and superconducting transmission lines are connected in series to form a meta-material absorber structure along the direction of propagation along the guiding structure.

In one embodiment, to reduce fabrication complexity and relax electrical tolerances, the sub-wavelength line sections are of constant physical width and uncorrected by compensation or tuning structures.

In one embodiment, the mode shape at each junction is matched; however, a reactive discontinuity arises from differing the impedance scale and phase velocity as set by the materials at the interface. In one embodiment, the discontinuities are intentionally adopted as part of the effective transmission line structure. With this choice, each line section is effectively homogenous (i.e., consistent with available modeling tool capabilities) and the proximitized region enters as an extension of the superconducting line length, which can be treated as a nuisance parameter (or if known from observation, incorporated) in the synthesis of the structure's targeted response.

In one embodiment, the superconducting-normal-metal interfaces serve as step-impedance junctions, whose phase can be used to shorten the total required transmission line delay and thus, reduce the total device footprint. In principle, the poles in the response of these line sections can also be used to reduce parasitic responses, and thus, improve the rejection above intended signal band if desired.

In one embodiment, the meta-material section lengths are chosen to transition along the structure from superconducting to normal-metal dominated to gracefully attenuate incident radiation within a finite footprint.

In one embodiment, the superconducting and normal-metals composite transmission line structures are realized by simultaneously varying the width of each material to tailor the effective impedance taper (see FIG. 1C). In one embodiment, the impedance taper employed can be adjusted to define the absorption bandpass shape. In one embodiment, the length of the taper is set by the residual reflectance, Γ, from the transition between the metamaterial structure and the superconducting guiding structure and the absorption of the structure. In one embodiment, the end of the termination is open, and power reflected from this boundary is subdominant to the residual reflectance of the input.

The present invention assumes the following hierarchy of length scales is physically present: the dielectric extinction length>>the radiation wavelength>>the transmission line geometric width and height (or the dielectric substrate thickness)>the superconducting penetration and/or longitudinal proximity length scales>the thin-film metallization thickness.

In addition, in one embodiment, the coating surface resistance scales meet the following:

$$|X\text{sq(superconductor)}| << R\text{sq(normal-metal)};$$

the latter of which is tailored to maximize absorption in a minimal footprint or adopts the surface resistance of a deposition used elsewhere on the structure. In one embodiment, the dissipation in the termination structure is dominated by the surface resistance of the normal-metal coating.

Usually, a transmission line characteristic impedance of ~25 ohms with a spacing greater than three (3) linewidths have a subdominant influence on the response of the guiding structure. However, the present invention allows the response of the structure to be determined by the metamaterial line parameters. However, more aggressive size reduction can be achieved at the expense of increased complexity in synthesis of the line parameters.

The present invention can be utilized in a number of structures used in transmission line design, and more importantly, can be used at room temperature with an appropriate choice of a high conductivity media (e.g., copper (Cu), aluminum (Al), silver (Ag), etc.) for the low loss line, and a dirty alloy, semi-metal (e.g., graphene, bismuth (Bi), etc.) semiconductor (e.g., degenerately doped silicon (Si), etc.) for the absorptive media.

More broadly, superconducting materials include, for example, elemental superconducting materials such as niobium (Nb), tantalum (Ta), titanium (Ti), etc.; or superconducting alloys with controlled stoichiometry such as niobium nitride, niobium titanium nitride, molybdenum nitride, etc. Normal conductor materials include, for example, non-superconducting elements such as copper (Cu), gold (Au), etc.; disordered metal alloys such as PdAu, TiAu, etc.; degenerately doped semiconductors such as Si, Ge, etc.; amorphous semi-metals such as carbon (C), bismuth (Bi), etc.; superconductors (above their respective transition temperature) such as platinum (Pt), tungsten (W), etc. Low loss dielectric material coatings commonly found in fabrication of thin film microelectronics include, for example, amorphous and single crystal forms of silicon (Si), alumina/sapphire, silicon nitride, silicon carbide, silica/quartz, synthetic diamond, etc.

In one embodiment, the device of the present invention can be folded or meandered to reduce its footprint. In one embodiment, bends with a radius large compared to the width of the line (and consistent with the magnitude targeted for Γ) can be used without the need to redesign the meta-material transmission line structure. In one embodiment, the spacing between the lines is specified by similar considerations to minimize interline coupling.

Figure 2A:
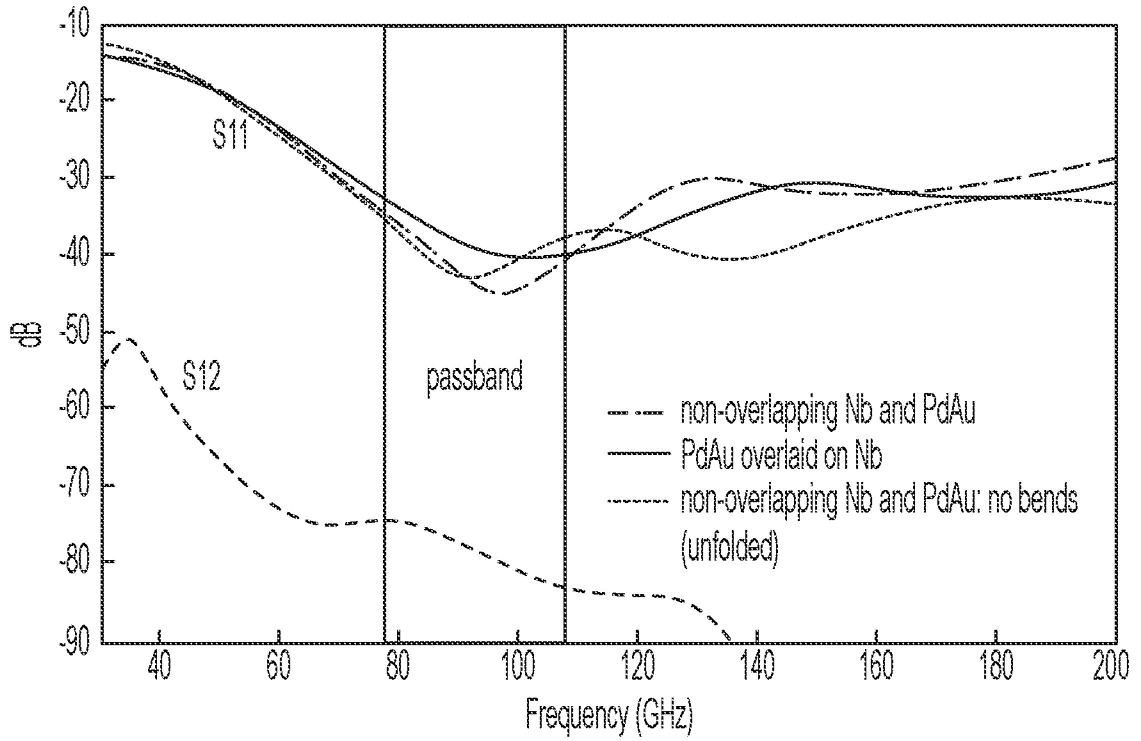
FIG. 2A shows a graph depicting a simulated device scattering parameters and influence of folded versus unfolded transmission line, according to one embodiment consistent with the present invention.

FIG. 2A shows a graph depicting a simulated device scattering parameters and influence of a folded versus unfolded transmission line, according to one exemplary embodiment of the present invention. The design used for this graph included a PdAu film with a surface resistance in the range of 4-6 Ohms per square and maintained a reflectance $\Gamma<0.001\approx-30$ dB, from 80-200 GHz. Similarly changes in line metallization width of +/−0.5 microns lead to acceptable performance of this spectral range.

In the exemplary embodiment, of a via-less crossover load, the graph of FIG. 2A shows that the lower edge of the passband is set by the total line length of the metamaterial line. As the wavelength of the radiation approaches the length of the line, the structure will no longer appear to be adiabatic and reflections from the structure will occur. The surface impedance of the normal metal film was chosen in this exemplary embodiment, such that the absorption encountered in twice the length of the line is greater than the targeted reflection coefficient. Progressively, increasing the length of the resistive sections as one move from the input port, improves power dissipation and minimizes the total length required to absorb the incident power.

Figure 2B:
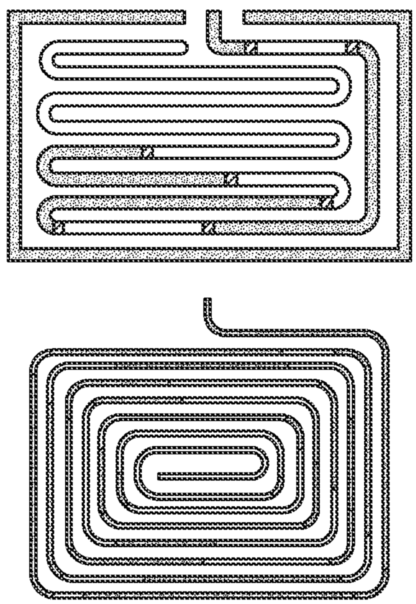
FIG. 2B shows scanning electron micrographs of broadband low-reflectance metamaterial microstrip terminations, in (upper) folded and (lower) spiral configurations, according to one embodiment consistent with the present invention.

FIG. 2B shows a scanning electron micrograph (SEM) of broadband low-reflectance metamaterial microstrip terminations in one exemplary embodiment of the present invention, with the (upper) folded and (lower) folded spiral configurations used to reduce the circuit footprint. The exemplary embodiment shown in FIG. 2B depicts the magic-tee termination.

In one exemplary embodiment, the present invention was used in a planar waveguide cavity configuration with an array of other transmission line circuits. In the exemplary embodiment, the space above the circuit was ~10× the substrate thickness and the area around the device is patterned with a thin film metamaterial coating having as surface resistance, $R_{sq}\sim\eta_o/(\varepsilon_r^{1/2}-1)$, (e.g., $R_{sq}$=157 ohm per square on silicon, $\varepsilon_r$=11.6) to absorb residual radiation from the structure and provide appropriate isolation between the arrays of superconducting circuit structures. In the exemplary embodiment, the lines were brought closer together to control/absorb higher order modes excited and to maintain high isolation between circuit elements.

In the exemplary embodiment, the use of discrete interfaces along the length of absorber (rather than along the length of a taper) minimizes the uncertainty in the microwave propagation parameters arising from proximitization at the superconducting and normal metal interfaces.

Accordingly, the meta-material termination of the present invention achieves a broadband absorption response with lower reflectance in a smaller physical footprint than existing adiabatic structures. The metamaterial strategy allows the kinetic inductance to be treated with existing modeling tools and proximitization at junctions can be incorporated if known from measurement (or given the hierarchical length scales accepted as a nuisance parameter impacting the superconducting section lengths). The absorption response has significantly lower sensitivity to fabrication tolerances, material properties, and modeling assumptions than the prior art. These aspects of the present invention are important considerations for cryogenic applications; however, they can also be used to improve the performance of room temperature planar transmission line structures found in microwave practice.

The present invention, as a broadband low-reflectance termination, is an element of a superconducting circuit, can be used in superconducting applications, which include quantum communications, computing, and sensors. Further, the present invention has utility in realizing high coupling efficiency absorbers, low reflectance power combiners/splitters port terminations, and calibration structures for superconducting applications.

In the context of far-infrared imaging, polarimetric, and superconducting integral field unit (IFU) spectrometer arrays for astrophysics, the present invention leads to terminations with higher performance, device yield, and overall circuit density.

In addition, commercial and other foundries producing high speed superconducting electronics circuits and devices are potential end users if high performance broadband structures are needed.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A broadband matched termination for use in planar superconducting transmission line circuit structures, comprising:

a plurality of sub-wavelength alternating sections of normal-metal and superconducting transmission lines connected in series to form a meta-material absorber structure along a direction of propagation along a superconducting guiding structure;

wherein a width of each of said plurality of sub-wavelength alternating sections of normal metal and superconducting transmission lines are varied to effectuate an impedance taper.

2. The broadband matched termination of claim 1, wherein a configuration of said metamaterial absorber structure includes propagation properties that are a function of a line geometry and a plurality of electromagnetic material properties.

3. The broadband matched termination of claim 1, wherein interfaces between said plurality of sub-wavelength alternating sections of normal-metal and superconducting transmission lines serve as step-impedance junctions.

4. The broadband matched termination of claim 1, wherein a length of said impedance taper is set by a residual reflectance, G, from a transition between said meta-material absorber structure and said superconducting guiding structure and an absorption of said meta-material absorber structure; and said length attenuates incident radiation within a predetermined footprint.

5. The broadband matched termination of claim 1, wherein said meta-material absorber structure is insensitive to geometric tolerances, material properties, and type of conductive element interface.

6. The broadband matched termination of claim 1, wherein the meta-material absorber structure is implemented at room temperature through a substitution of a high conductivity metal for superconducting media.

7. The broadband matched termination of claim 1, wherein the planar superconducting transmission line circuit structures support transverse electro-magnetic (TEM), quasi-TEM and non-TEM configurations through patterning and layering of conductive layers and dielectric layers.

8. The broadband matched termination of claim 7, wherein said TEM configuration includes at least one of a stripline or a parallel plate, said quasi-TEM configuration includes at least one of:

a microstrip, a microstrip with ground plate slot, a finite width coplanar waveguide, or a microstrip with grounded coplanar waveguide; and said non-TEM configuration includes at least one of a slotline or a finite width slotline.

9. The broadband matched termination of claim 8, wherein said TEM, quasi-TEM, and non-TEM configurations include circuit structures each comprising a dielectric layer and a metal layer disposed on said dielectric layer;

wherein said dielectric layer includes a homogenous composition and thickness; and wherein said metal layer is patterned to provide a predetermined functionality.

10. The broadband matched termination of claim 1, wherein said impedance taper is adjusted to define an absorption bandpass shape.

11. The broadband matched termination of claim 10, wherein said plurality of sub-wavelength alternating sections are of constant physical width and uncorrected by compensation or tuning structures.

* * * * *